(12) United States Patent
Jost et al.

(10) Patent No.: US 6,227,561 B1
(45) Date of Patent: *May 8, 2001

(54) ROOFLINER FOR A MOTOR VEHICLE

(75) Inventors: Stefan Jost, Wiesbaden; Reuter Jörg, Mainz, both of (DE)

(73) Assignee: Breed Automotive Technology, Inc., Lakeland, FL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/237,766

(22) Filed: Jan. 26, 1999

(30) Foreign Application Priority Data

Apr. 6, 1998 (DE) .............................. 198 15 381

(51) Int. Cl.[7] .................................. B60R 21/22
(52) U.S. Cl. .................................. 280/730.2; 280/743.1; 296/214
(58) Field of Search .............................. 280/730.1, 730.2, 280/728.1, 743.1; 296/214

(56) References Cited

U.S. PATENT DOCUMENTS

| 2,806,737 | 9/1957 | Maxwell . | |
|---|---|---|---|
| 3,733,088 | 5/1973 | Stephenson | 280/150 AB |
| 5,265,903 | * 11/1993 | Kuretake et al. | 280/730.2 |
| 5,333,899 | * 8/1994 | Witte | 280/730.2 |
| 5,362,097 | 11/1994 | Barske | 280/730 R |
| 5,382,051 | 1/1995 | Glance | 280/751 |
| 5,540,459 | * 7/1996 | Daniel | 280/730.2 |
| 5,775,726 | 7/1998 | Timothy et al. | 280/730.1 |
| 5,791,683 | * 8/1998 | Shibata et al. | 280/730.2 |
| 5,833,304 | * 11/1998 | Daniel et al. | 296/214 |
| 5,863,063 | * 1/1999 | Harrell | 280/730.2 |
| 5,865,462 | 2/1999 | Robins et al. | 280/730.2 |
| 5,921,575 | * 7/1999 | Kretschmer et al. | 280/728.2 |
| 5,924,722 | * 7/1999 | Koide et al. | 280/730.2 |
| 6,042,141 | * 3/2000 | Welch et al. | 280/729 |
| 6,070,902 | * 6/2000 | Kowalski et al. | 280/728.2 |
| 6,079,732 | * 1/1999 | Nakajima et al. | 280/728.2 |

FOREIGN PATENT DOCUMENTS

| 29616904 | 3/1997 | (DE) . |
| 19612229 | 10/1997 | (DE) . |
| 19622231 | 12/1997 | (DE) . |
| 694444A2 | 1/1996 | (EP) . |
| 791511A1 | 8/1997 | (EP) . |

* cited by examiner

Primary Examiner—J. J. Swann
Assistant Examiner—David R. Dunn
(74) Attorney, Agent, or Firm—Lonnie Drayer

(57) ABSTRACT

The invention relates to a roofliner for a motor vehicle, having at least one airbag module arranged in the region of the vehicle roof. The airbag module has an airbag and a conduit for gas that are integrated into the roofliner, so that the airbag module and roofliner form a unit.

7 Claims, 5 Drawing Sheets

ROOFLINER FOR A MOTOR VEHICLE

FIELD OF THE INVENTION

The invention relates to a roofliner, also known as a headliner, for a motor vehicle having at least one airbag module arranged in the region of the vehicle roof.

BACKGROUND OF THE INVENTION

It is known, for example from DE 29 616 904 U1 to arrange airbag modules in the region of the roof of a motor vehicle. These airbag modules, referred to as side curtain airbag modules, are arranged in the region of the lateral roof rail in the interior of the motor vehicle. In the event of an accident, the airbag of such an airbag module is deployed, starting from the vehicle roof, to cover the side windows of the motor vehicle. As a result, the head of a vehicle occupant is effectively protected by the inflated airbag, in particular in the case of a side impact or rollover of the vehicle.

It is known, for example from EP 0 791511 A1, for airbag modules to be securely bolted to the vehicle roof, in particular to the lateral roof rail. Following installation of the airbag module into the vehicle, a roofliner that lines the entire roof area of the vehicle toward the interior is then fitted. This roofliner also covers the airbag module fastened to the roof rail. In addition, the roofliner has a predetermined breaking point in the region behind which the airbag module is arranged, with the result that the roofliner can tear open upon inflation of the airbag of the airbag module.

These known airbag modules and roofliners require a relatively large installation space, since sufficient space for the airbag module and its fastening elements must be provided between the roofliner and the vehicle roof. Furthermore, installation is very laborious, since the airbag module first has to be installed in the motor vehicle and only then can the roofliner be fitted, in a further operation. There is additionally the risk of the airbag module being damaged during the installation of the roofliner, whereby the functional reliability of the airbag module may be impaired.

SUMMARY OF THE INVENTION

It is the object of the invention to provide an improved roofliner for a motor vehicle, having at least one airbag module arranged in the region of the vehicle roof, which can be produced at low cost and can be installed simply and quickly, without impairing the functional reliability of the airbag module.

The roofliner according to the invention makes it possible for the roofliner and an airbag module arranged in the region of the roof to be installed at the same time. It dispenses with additional fastening elements for the fastening of the airbag module, whereby both the costs of the individual parts and the installation effort or installation costs can be reduced. Furthermore, the reduced number of individual parts also reduces the overall weight of the roofliner and airbag module, which is desirable with regard to lowest possible vehicle weight. The airbag module is integrated into the roofliner before the installation of the roofliner into the vehicle, preferably during the manufacture of the roofliner. During installation into the motor vehicle, it is then only necessary that the roofliner be installed, whereby the airbag module which is integrated into the roofliner is installed at the same time. Consequently, no additional, complicated, installation step is required for the installation of the airbag module, whereby the installation costs can be reduced considerably.

This simplified installation additionally favors the use of robots, whereby installation can be further optimized. Furthermore, the reduced number of installation steps allows the number of possible sources of error to be reduced, allowing increased reliability of the function of the airbag module to be ensured. Dispensing with additional fastening elements for the airbag module allows the latter to be made smaller, i.e. saving more space. The roofliner can consequently be fitted closer to the vehicle roof, which leads to increased head clearance in the vehicle interior.

The roofliner preferably consists of a foamed or molded material, the airbag module being foamed or molded into the roofliner. This arrangement allows an extremely low-cost integration of the airbag module into the roofliner. The airbag module is placed into the corresponding mold before the molding or foaming of the roofliner and then integrated simultaneously into the latter during the forming of the roofliner. The molding, or foaming, in of the airbag module implies that it is arranged in a protected manner in the roofliner, whereby the risk of damage to the airbag module during installation of the roofliner into the motor vehicle is minimized.

The roofliner is preferably made up of at least two layers, the airbag module being arranged between the layers. This arrangement allows even better protection of the airbag module from damage, since it is completely surrounded by the layers of the roofliner. There can be formed a continuous surface, which is not visually impaired by the airbag module, facing the vehicle interior. At the same time, the airbag module is also protected on the roof side by a layer of the roofliner. The multi-layered composition of the roofliner additionally allows a visually appealing design of the roofliner with high strength at the same time. For example, the side of the roofliner facing the vehicle interior may be formed as a fabric layer, while other layers of the roofliner are formed, for example, by foamed or fiber-reinforced plastics, in order to give the roofliner the required strength.

In the region of the airbag module there is preferably provided at least one predetermined tear seam. Such a tear seam allows predictable and controlled tearing open of the roofliner when the airbag of the airbag module is deployed in the event of a crash. In this case, a gas generator is activated by a sensor to generate gas that is fed via a conduit to the airbag. In this way, the airbag is instantaneously inflated and presses on the roofliner, which then tears open along the tear seam.

The airbag and the conduit are also preferably arranged within an additional enclosure, in particular a fabric enclosure. This enclosure offers secure protection of the airbag module, i.e. the airbag and the conduit for gas, during installation or integration into the roofliner. For, instance, the entire airbag module may be arranged in the enclosure when it is supplied to a roofliner manufacturer, where it is then integrated into the roofliner. The airbag module is in this case protected by the additional enclosure, in particular during transportation. The additional enclosure is advantageous in particular during molding, or foaming in, since no additional measures have to be taken in order to shield the airbag and the conduit for gas from the material of the roofliner. The liquid material, adhesive or similar substances are prevented from coming into contact with the airbag or the conduit for gas, whereby the functional capability of the airbag module would be impaired.

At least one tearing-open point or tear seam is preferably provided in the enclosure. It is ensured by this design that the enclosure easily opens upon deployment or inflation of the airbag, in order to make it possible for the airbag to leave the enclosure. By specifically selected arrangement of this tearing-open point or tearing-open seam, the direction in which the airbag is deployed upon inflation can be controlled.

The airbag is advantageously fastened to the body of the vehicle by fastening elements and in particular by fastening elements for a handle. In this way, the airbag can be securely fastened to the body of the vehicle, in order to be securely held in the event of deployment or inflation. If this fastening is performed by the fastening elements for a handle commonly provided in a motor vehicle, additional fastening elements can be saved. The fastening bolts for a handle, usually located above the vehicle door, preferably extend through the roofliner and the airbag and engage in a part of the body of the vehicle. As a result, the handle, the roofliner and the airbag are simultaneously connected securely to the vehicle body by the same fastening element.

It is further preferred for the conduit for gas to be formed by a flexible woven-fabric hose. Such a flexible woven-fabric hose as a conduit for gas makes it possible for the entire airbag module to be of a flexible design, with the result that it can be easily adapted to the contour of the roofliner. Stresses, which can easily occur if a rigid conduit for gas is used, are also avoided during the integration of the airbag module into the roofliner. The flexible design of the conduit for gas, and advantageously of the entire airbag module, makes it possible to compensate for minor dimensional inaccuracies during the production of the roofliner and during installation into the motor vehicle. If a rigid conduit for gas is used, there is the risk of damage if the roofliner is deformed during installation into the motor vehicle. This risk can be avoided with a flexible woven-fabric hose.

The airbag module is preferably a side curtain airbag module, the airbag of which in the inflated state extends along one side of the vehicle interior, starting from the roofliner. A side curtain airbag module is arranged in the roofliner along the lateral roof rail on the driver and/or passengers's side. The airbag of such an airbag module is intended to protect the vehicle occupants, in particular in the event of a side impact or rollover of the vehicle. Starting from the roofliner, the airbag, which has been deployed in the event of a crash, extends between the respective vehicle occupant and the side of the vehicle, in particular the side window.

BRIEF DESCRIPTION OF THE DRAWINGS

The invention is described below by way of example with reference to attached drawings, in which.

DETAILED DESCRIPTION OF THE INVENTION

Figure 1:
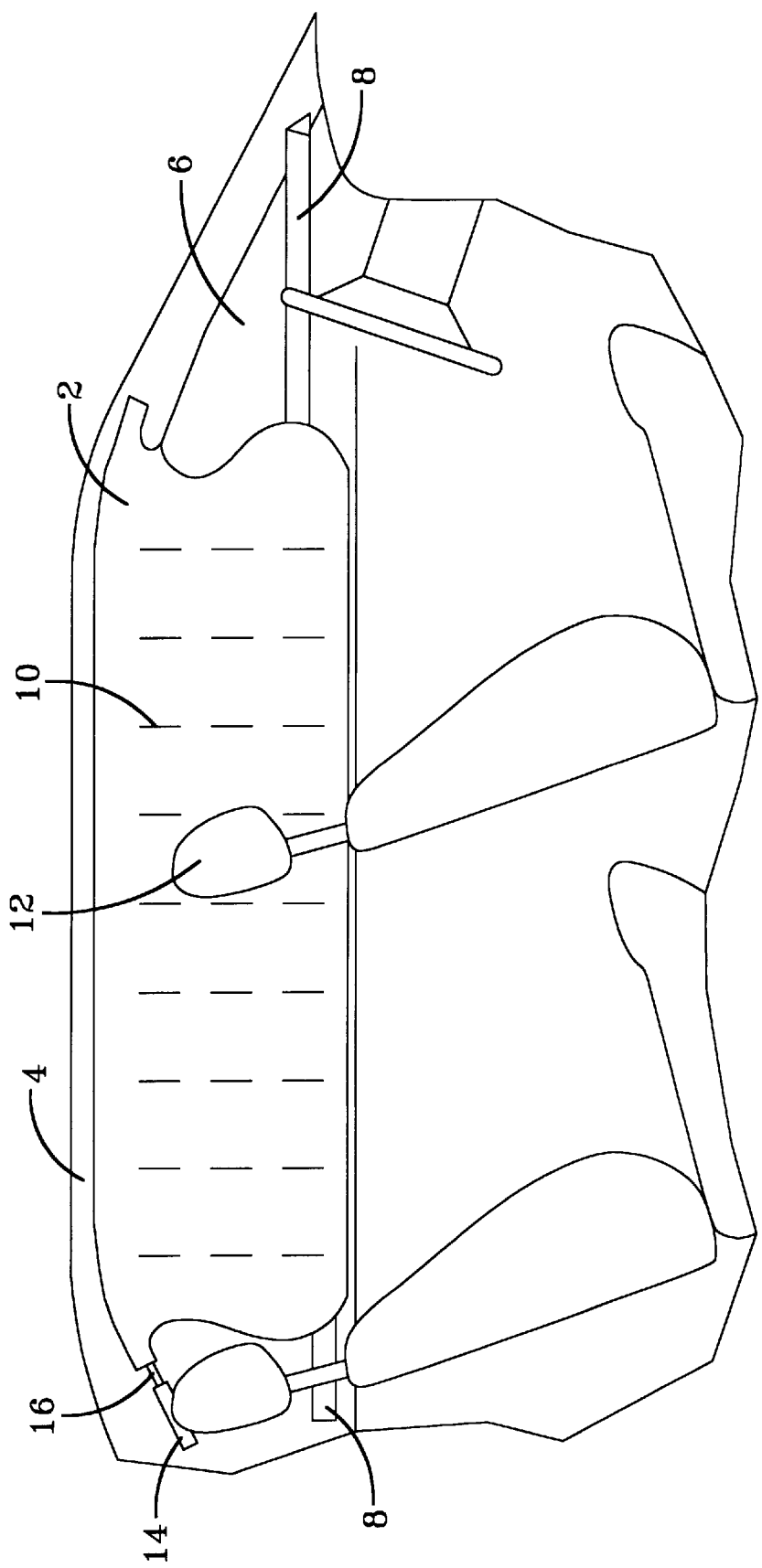
FIG. 1 shows a basic diagram of a curtain airbag module.

FIG. 1 shows a basic diagram of a curtain airbag module with inflated airbag 2. The airbag 2 extends from the vehicle roofliner 4 along virtually the complete side to around the lower edge of the side windows 6 in the vehicle interior. In the lower region, the airbag 2 is fastened by means of tightening bands 8 to the A pillar and the C pillar of the motor vehicle. The airbag 2 additionally has in its middle seams 10, by which the two outer sides of the airbag 2 are sewn to each other, thereby forming several air chambers. As a result, on the one hand increased stability and strength of the airbag is achieved, on the other hand it is possible in this way to create in the airbag 2 sewn-off regions which reduce the volume, making it possible that a smaller gas generator can be used. For example, in this way regions of the airbag 2 which are not in the direct vicinity of a vehicle occupant, such as for example the region directly behind the front headrest 12, may be sewn off, with the result that they are not filled with gas during the inflation of the airbag. The gas generator 14 is arranged in the region of the C pillar and is connected to the airbag 2 by means of a conduit for gas 16. The conduit 16 is preferably designed as a tube or hose and extends through the entire airbag 2 in the longitudinal direction of the vehicle. Inside the airbag 2, the conduit for gas 16 is designed as a gas distributor; i.e. it has numerous openings for the specifically selected introduction of the gas into the airbag 2. The airbag 2 preferably consists of a synthetic woven fabric, which may additionally be silicone-coated. Consequently, along with the possibility of sewing individual parts of the airbag 2 to one another there is also the possibility of welding these parts to one another, thereby achieving lower-cost production. For instance, the seams 10 may also easily be formed by welding together the outsides of the airbag.

Figure 2:
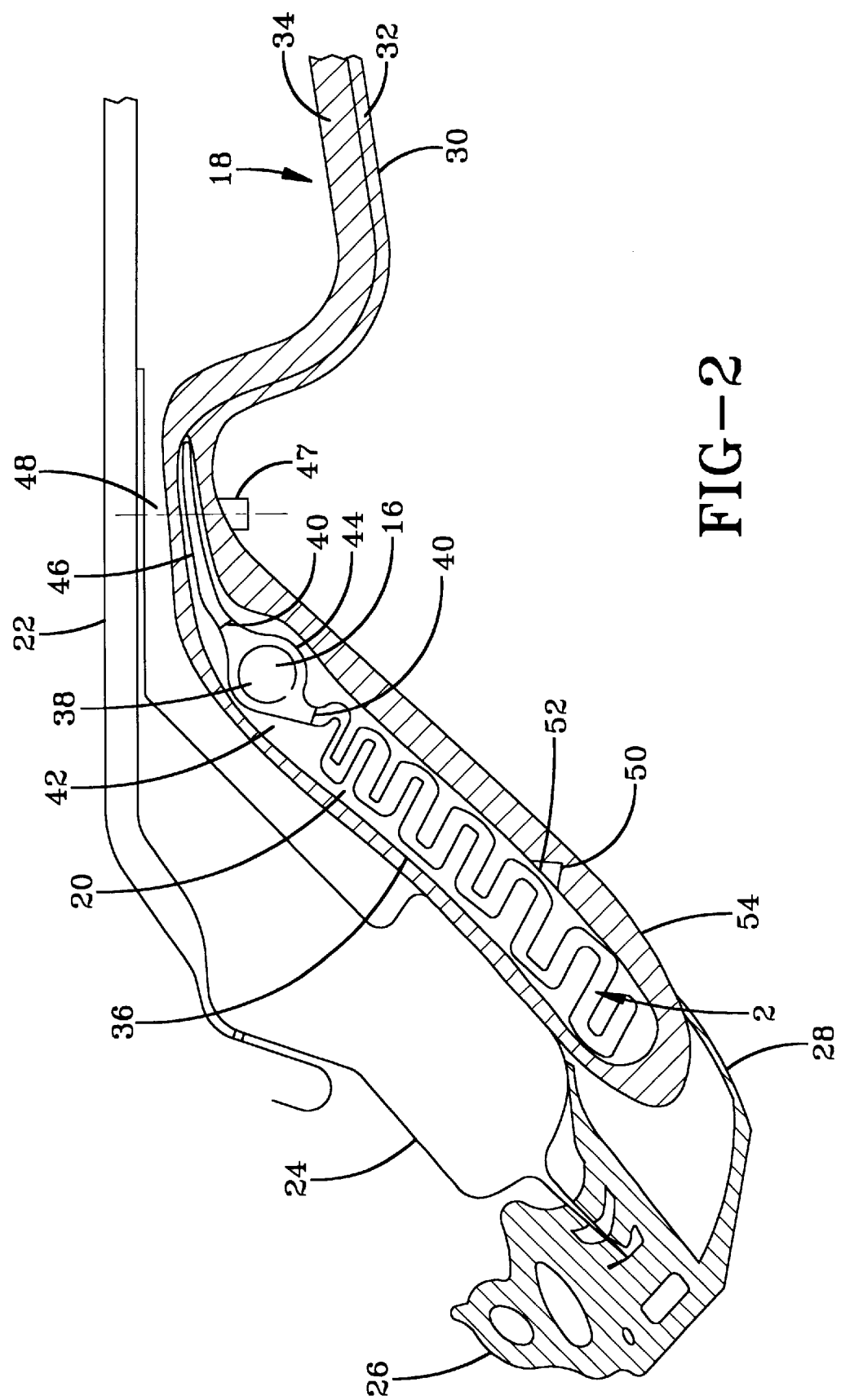
FIG. 2 shows a sectional view of the roofliner.

FIG. 2 shows a sectional view of the roofliner 18 according to the invention, having an integrated airbag module 20. The vehicle roof 22 has on its side a roof rail 24. At the outer end of the roof rail 24 there is fitted a door seal 26, which seals the gap between the vehicle door and the remaining body. Arranged underneath the vehicle roof 22 is the roofliner 18, in order to line the roof panel and reinforcing elements on the roof. The roofliner extends substantially along the contour of the vehicle roof 22 and of the roof rail 24, but may also be designed such that cavities are formed between the body and the roofliner 18. Additional modules of a motor vehicle, such as for example the drive of a sliding roof or the interior lighting, may be integrated in such cavities. In the lateral region, starting from the vehicle roof 22, the roofliner 18 extends substantially parallel to the roof rail 24 into the region of the door seal 26. The door seal 26 bears against the roofliner 18 with a lip 28 directed toward the vehicle interior and thus forms a sealing transition. The side of the roofliner 18 facing the vehicle interior is formed by a fabric layer 30. This fabric layer 30 is preferably designed as a layer of flocked fabric. It may, however, also be formed by other materials, such as for example a woven fabric layer or leather, adapted to the interior design of the motor vehicle. Adjoining the fabric layer 30 on the side of the roofliner 18 facing the roof are two foam layers 32 and 34. In the region of the roofliner 18 that extends parallel to the roof rail 24, the airbag module 20 is integrated. The airbag module 20 is arranged between the two foam layers 32, 34 and is in this case completely enclosed by the foam layers 32 and 34. The airbag module 20 comprises a fabric enclosure 36, which encloses the entire airbag module 20. Arranged within the fabric enclosure 36 are the folded-together airbag 2 and the conduit for gas 16. The conduit for gas 16 is a gas distributor in the form of a flexible woven-fabric hose that extends through virtually the entire airbag 2 in the longitudinal direction of the vehicle. The conduit for gas 16 is connected in the region of the A pillar and/or C pillar of the motor vehicle to at least one gas generator 14. In the region in which the conduit for gas 16 is located within the airbag 2 there are provided numerous gas-outlet openings 38, which allow a uniform feeding of gas into the interior of the airbag 2. The airbag 2 comprises a plurality of parts of synthetic woven fabric, which are sewn or welded to one another. Welding the parts of the airbag 2, in particular by ultrasonic welding, allows a low-cost production of the airbag 2. The conduit for gas 16 is fixed in the airbag by seams 40. The seams 40 extend largely parallel to the conduit for gas 16 and join two fabric layers 42, 44 lying one on top of the other, from which the airbag 2 is formed. In this case, the seams 40 are designed such that passing through of gas into the airbag 2 is possible, in order to allow a rapid inflation of the airbag 2. In the embodiment shown here, the conduit for gas 16 or the gas distributor is arranged approximately in the transitional region between the vehicle roof 22 and roof rail 24. The folded-together airbag 2 lies underneath the roof rail 24, on the side of the conduit for gas 16 facing the door seal 26. Starting from the conduit for gas 16, an extension 46 of the airbag 2 extends in the other direction, parallel to the vehicle roof 22. The extension 46 of the airbag 2 consequently extends into the region in which the fastening 48 for a handle 47 is provided. The handle 47 is bolted onto the side of the roofliner 18 facing the vehicle interior in such a way that the bolts penetrate both the roofliner 18 and the extension 46 of the airbag 2 and then engage in a part of the body in the region of the vehicle roof 22 or the roof rail 24. As a result, at the same time as the fastening of the handle 47, the roofliner 18, and in particular also the airbag 2, is fastened to the body. This consequently dispenses with additional installation operations for the fastening of the roofliner 18 and the airbag module 20. At the same time, a secure fastening of the airbag 2 to the body can be ensured, which is necessary in order that the forces occurring during the inflation of the airbag 2 and during the impact of a vehicle occupant can be absorbed.

In the region of the roofliner 18 in which the airbag module 20 is located there is provided a predetermined breaking point 50 on the foam layer 32 facing the vehicle interior. In the exemplary embodiment shown here, the predetermined breaking point 50 in the roofliner 18 is located approximately midway between the door seal 26 and the conduit for gas 16. The predetermined breaking point 50 is in this case designed as a notch on the side of the foam layer 32 facing the airbag module 20, such that the side of the foam layer 32, or of the roofliner 18, facing the vehicle interior forms a continuous surface from which the notch opens out or enlarges toward the airbag module 20. Consequently, the predetermined breaking point 50 cannot be seen from the vehicle interior. The notch forming the predetermined breaking point 50 extends in the longitudinal direction of the vehicle, substantially parallel to the conduit for gas 16, over the entire length of the airbag module 20. Such a notch for forming the predetermined breaking point 50 may be impressed into the foam layer 32 or already formed correspondingly in the mold for the foam layer 32.

In the region lying opposite the predetermined breaking point 50, a tearing seam 52, which extends along the predetermined breaking point 50, is provided in the fabric enclosure 36. In the event of an accident the airbag 2 is inflated by means of the gas generator 4 and the conduit for gas 16. The volume of the airbag quickly enlarges and the fabric enclosure 36 tears along the tearing seam 52, while the roofliner 18 tears open along the predetermined breaking point 50. The roofliner 18 opens and the airbag 2 is deployed into the vehicle interior. The parts of the roofliner 18 adjacent to the predetermined breaking point 50 in this case swing apart. The part 54 facing the door seal 26 comes to lie between the airbag 2 and the side of the vehicle, in particular the side windows and their surround or mounting. In this way, it protects the unfolding airbag 2 from being damaged by further parts of the interior lining. To facilitate the swinging apart of the parts of the roofliner 18 adjacent to the predetermined breaking point 50, there may be formed in the roofliner 18 further thickenings or notches, which act like joints or hinges during the swinging apart.

The position of the predetermined breaking point 50 and of the tearing seam 52 is not restricted to the arrangement shown here. Depending on the application and vehicle type, it may also be arranged in the region of the conduit for gas 16 or in the region of the door seal 26. For instance, the tearing seam 52 and the predetermined breaking point 50 may be arranged underneath the lip 28 of the door seal 26 said lip facing the vehicle interior. In this embodiment, when it is inflated, the airbag 2 presses the lip 28 of the door seal 26 to the side, with the result that the airbag 2 can unfold into the interior of the vehicle. It is possible to dispense with the predetermined breaking point 50 entirely if the roofliner 18 has in the region underneath the lip 28 an opening through which the airbag 2 can leave. In this embodiment as well, the lip 28 is pressed to the side during the unfolding or inflation of the airbag 2, in order to clear the path for the airbag 2 into the vehicle interior.

The design of the roofliner 18 is not restricted to the example shown here. For instance, the roofliner 18 may also be made up of numerous different layers. These layers may be various layers of fabric, paper or plastic. Various plastics may be used, in particular a combination of various plastics, in particular fiber-reinforced plastics, also being conceivable. Furthermore, the airbag module 20 does not have to be surrounded directly and fully by the foam layers 32 and 34. For example, the airbag module 20 may be surrounded on its side facing the roof rail 24 only by a fabric or paper layer of the roofliner 18.

Figure 3:
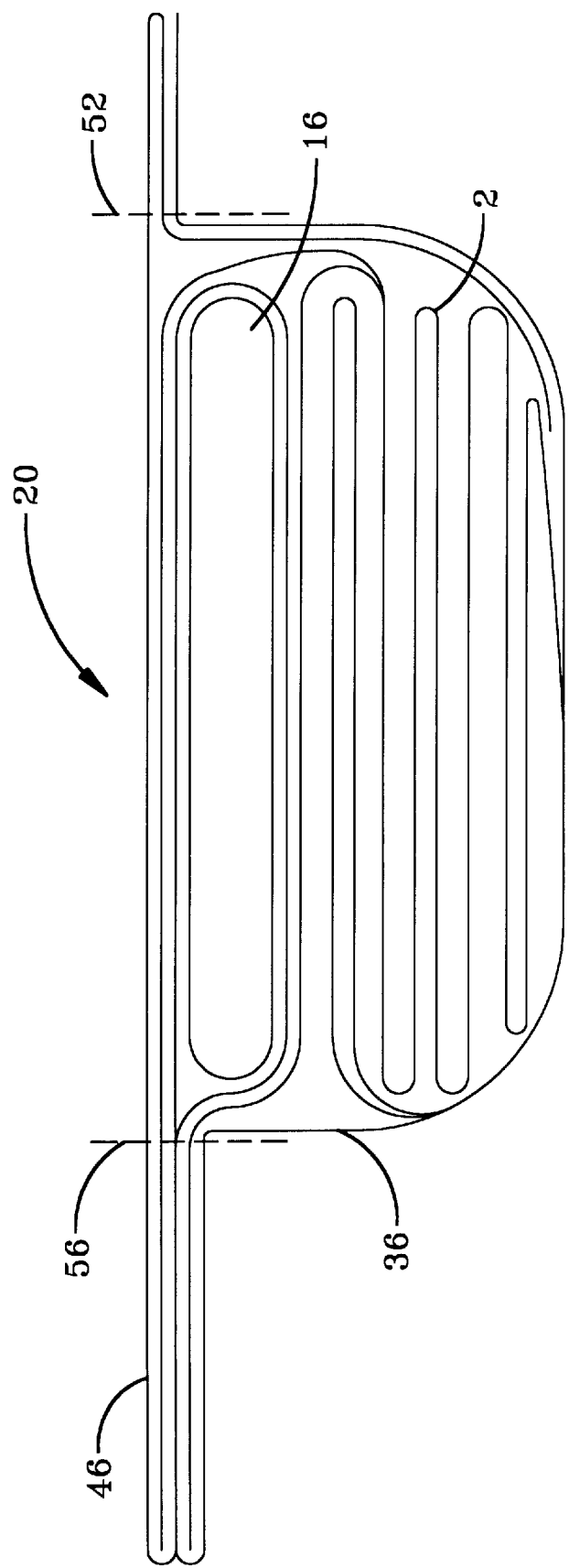
FIG. 3 shows a sectional view of the airbag module before integration into the roofliner.

FIG. 3 shows a sectional view of the airbag module 20 before integration into the roofliner 18. The thus preinstalled airbag module 20 may then easily be placed into the corresponding mold during the production of the roofliner 18. The airbag module 20 shown in this exemplary embodiment has a flat, approximately oval conduit for gas 16. The conduit for gas 16 extends inside the airbag 2, which is arranged folded-together underneath the conduit for gas 16. The entire airbag module 20, i.e. the airbag 2 and the conduit for gas 16, is enclosed by the fabric enclosure 36. The airbag 2 and the fabric enclosure 36 are to the left of the conduit for gas 16 in the drawing, substantially parallel to the device sewn or welded to each other by a seam 56. On the left-hand side, the extension 46 of the airbag 2 and the fabric enclosure 36 extend beyond the seam 56 on the side facing away from the conduit for gas 16. This region is fastened with the roofliner 18 to the vehicle body by the fastening for a handle 48 during installation into a motor vehicle. To the right of the conduit 16, the fabric enclosure 36 is sewn or welded by the tearing seam 52. The fabric enclosure 36 can consequently open along the tearing seam 52 upon inflation of the airbag 2 and allows the airbag 2 to be deployed.

Figure 4:
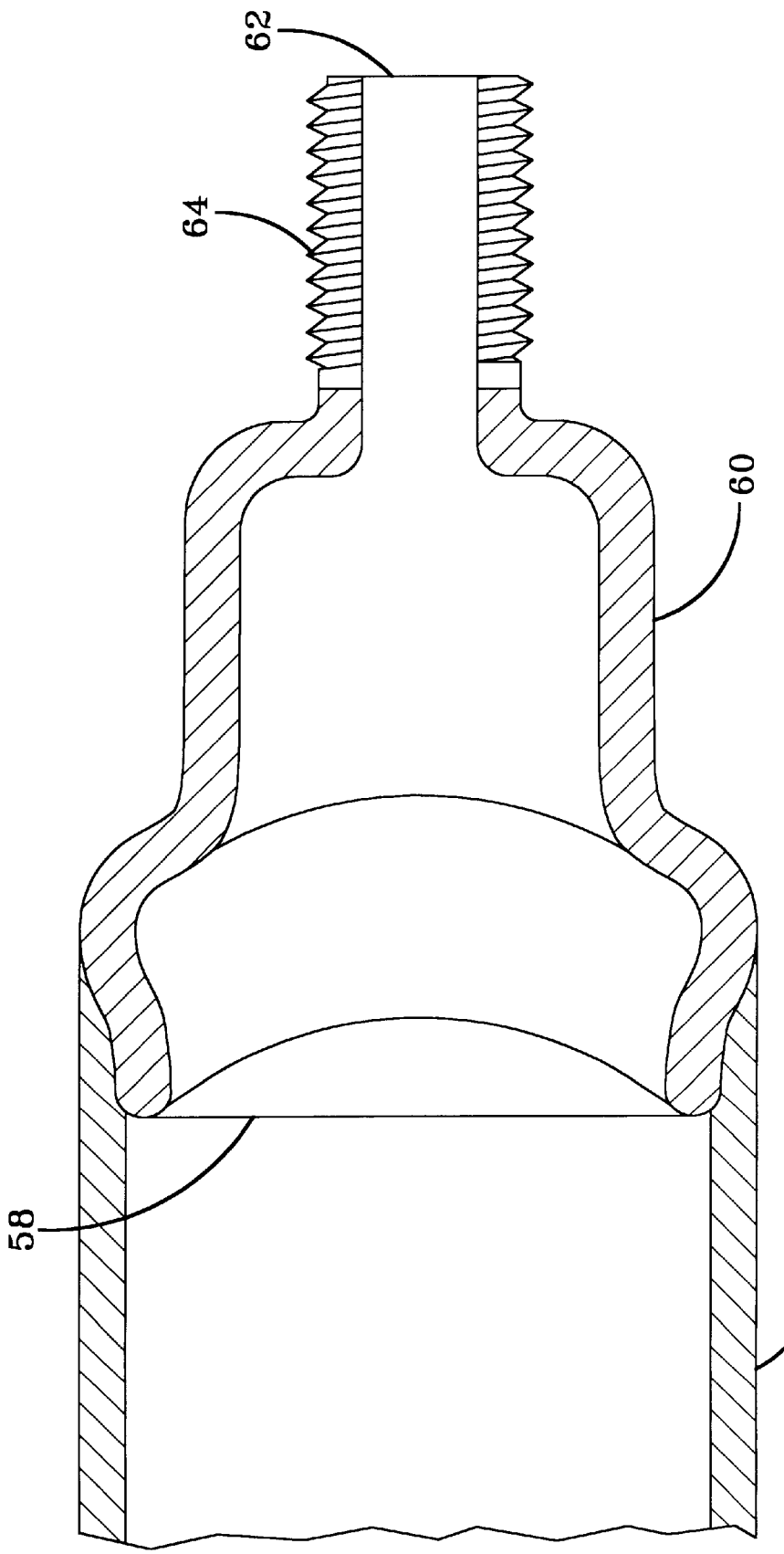
FIG. 4 shows a sectional view of a first embodiment of the connection of the conduit for gas to a gas generator.
Figure 5B:
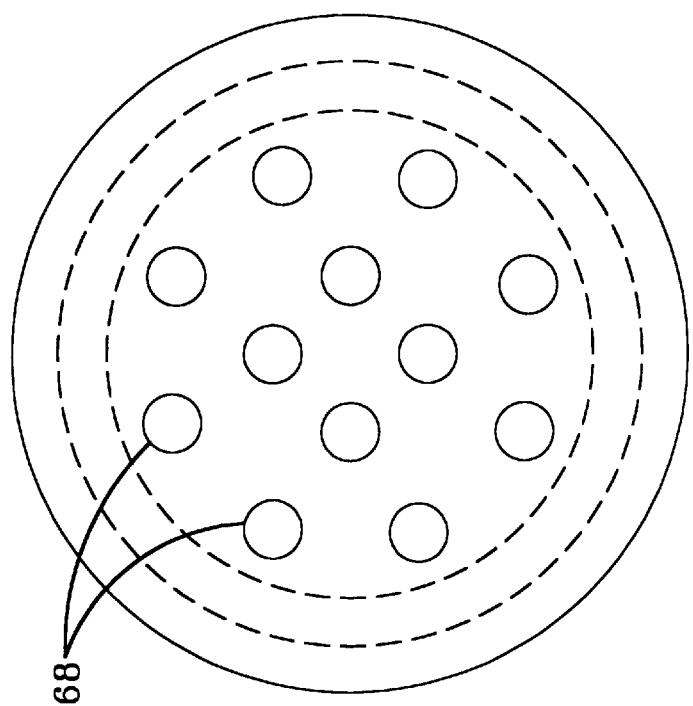
FIGS. 5a and 5b show a side elevation cross section and end view, respectively, of a second embodiment of the connection of the conduit for gas to a gas generator.
Figure 5A:
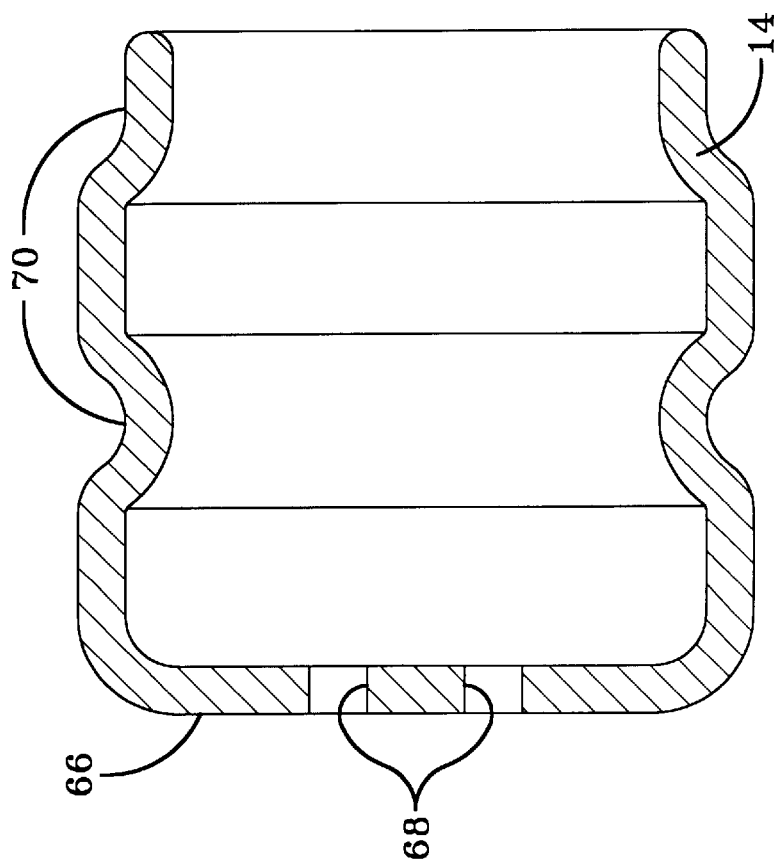

FIGS. 4, 5a and 5b show two exemplary embodiments of the connection of the conduit for gas 16 to the gas generator 14. A gas generator 14 whose gas-outlet openings are arranged in the axial direction on an end face of the gas generator 14 is advantageously used. FIG. 4 shows an end piece of a gas generator 14 with a substantially cylindrical gas-outlet opening 58 in the axial direction. Fitted to the gas-outlet opening 58 in the axial direction of the gas generator 14 is a transitional piece 60. The transitional piece 60 is likewise substantially cylindrical and, starting from the gas-outlet opening 58, tapers toward its free end 62. The free end 62 is designed as a threaded tube 64, onto which the conduit for gas 16 can be screwed by means of a corresponding coupling. This design allows a simple connection of the gas generator 14 to the conduit for gas 16 after installation of the roofliner 18 with the airbag module 20 into the motor vehicle. The installation of the gas generator 14 after the roofliner 18 has been installed into the motor vehicle has the advantage that damage to the gas generator 14 during installation of the roofliner 18 can be avoided.

In the case of the embodiment of the connection of the gas generator 14 to the conduit 16 shown in FIGS. 5*a* and 5*b*, the end region of the substantially cylindrical gas generator 14 is formed by a base 66. In the base 66 there are numerous gas-outlet openings 68, which extend in the axial direction of the gas generator 14. On its circumference, the end region of the gas generator 14 has grooves 70. For the fastening of the conduit for gas 16, the latter is pushed in the axial direction onto the end region of the gas generator 14 over the grooves 70 and then securely clamped by means of one or more clips on the circumference of the gas generator 14, and in particular of the grooves 70. In this embodiment, the conduit for gas 16 is securely held at the grooves 70. This embodiment is consequently suitable in particular for the connection of a gas generator 14 to a conduit for gas 16 in the form of a flexible woven-fabric hose.

Obviously numerous modifications can be made to the invention without departing from its scope as defined in the appended claims.

What is claimed is:

1. A roofliner for a motor vehicle comprising an airbag module arranged in the region of a vehicle roof, the airbag module comprising an airbag and a conduit for gas and being integrated into the roofliner such that the airbag module and roofliner form a unit, the side of the roofliner facing the vehicle interior comprising an exterior layer of a material selected from the group of flocked fabric, woven fabric and leather, adjoining the exterior layer on the side of the roofliner facing the vehicle roof are two juxtaposed foam layers and the airbag module is arranged between the two foam layers with one of the foam layers disposed between the airbag module and the exterior layer of the roofliner and the other foam layer disposed between the airbag module and a roof rail of the vehicle, the foam layer disposed between the airbag module and the exterior layer of the roofliner has a predetermined breaking point therein which extends in the longitudinal direction of the vehicle and is spaced apart from a door seal, the roofliner tears open along said predetermined breaking point when the airbag is inflated such that the airbag is deployed into the vehicle interior through the resulting opening in the roofliner.

2. The roofliner of claim 1 wherein the airbag and the conduit are arranged within an additional fabric enclosure.

3. The roofliner of claim 2, in which at least one tearing-open point or tearing-open seam is provided in the enclosure, the tearing-open point being aligned with the predetermined breaking point in the foam layer disposed between the airbag module and the exterior layer of the roofliner.

4. The roofliner of claim 3 wherein the airbag is fastened to the body of the vehicle by fastening elements for a handle.

5. The roofliner of claim 1 wherein the airbag is fastened to the body of the vehicle by fastening elements for a handle.

6. The roofliner of claim 1 wherein the conduit for gas is a flexible woven-fabric hose.

7. The roofliner of claim 1 wherein the airbag module is a side curtain airbag module.

* * * * *